United States Patent
Kolarov et al.

(10) Patent No.: US 6,650,338 B1
(45) Date of Patent: *Nov. 18, 2003

(54) HAPTIC INTERACTION WITH VIDEO AND IMAGE DATA

(75) Inventors: Krasimir D. Kolarov, Menlo Park, CA (US); Steven E. Saunders, Cupertino, CA (US)

(73) Assignee: Interval Research Corporation, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 33 days.

(21) Appl. No.: 09/199,040

(22) Filed: Nov. 24, 1998

(51) Int. Cl.⁷ .......................... G09G 5/00; G09B 21/00
(52) U.S. Cl. ...................................... 345/619; 434/113
(58) Field of Search ................................. 345/619, 441; 382/190, 199, 203; 434/113, 114, 117, 262, 266–268, 272, 275

(56) References Cited

U.S. PATENT DOCUMENTS

| | | | |
|---|---|---|---|
| 5,019,809 A | | 5/1991 | Chen |
| 5,220,260 A | | 6/1993 | Schuler |
| 5,327,177 A | * | 7/1994 | DesJardins et al. ......... 348/586 |
| 5,381,080 A | | 1/1995 | Schnell et al. |
| 5,414,337 A | | 5/1995 | Schuler |
| 5,576,727 A | | 11/1996 | Rosenberg et al. |
| 5,581,670 A | | 12/1996 | Bier et al. |
| 5,587,937 A | | 12/1996 | Massie et al. |
| 5,617,114 A | | 4/1997 | Bier et al. |
| 5,623,582 A | | 4/1997 | Rosenberg |
| 5,625,576 A | | 4/1997 | Massie et al. |
| 5,629,594 A | | 5/1997 | Jacobus et al. |
| 5,636,038 A | * | 6/1997 | Lynt et al. .................. 358/471 |
| 5,642,469 A | | 6/1997 | Hannaford |
| 5,691,898 A | | 11/1997 | Rosenberg et al. |
| 5,694,013 A | | 12/1997 | Stewart et al. |
| 5,701,140 A | | 12/1997 | Rosenberg et al. |
| 5,709,219 A | | 1/1998 | Chen et al. |
| 5,719,561 A | | 2/1998 | Gonzales et al. |
| 5,721,566 A | | 2/1998 | Rosenberg et al. |
| 5,724,264 A | | 3/1998 | Rosenberg et al. |
| 5,729,811 A | | 3/1998 | Takahata et al. |
| 5,731,804 A | | 3/1998 | Rosenberg et al. |

(List continued on next page.)

OTHER PUBLICATIONS

Kobbelt, L., et al. "Interactive Multi–Resolution Modeling on Arbitrary Meshes," *Computer Graphics Proceedings Annual Conference*, pp. 105–114, (1998).

(List continued on next page.)

*Primary Examiner*—Thu Nguyen
(74) *Attorney, Agent, or Firm*—Van Pelt & Yi LLP (57) ABSTRACT

The methods and systems of the present invention receive video or image data, for example via television broadcast, cable, or satellite television signal, or directly from a video player, and process the data to determine the geometry and material properties of various objects represented in the video image. Geometry and material property information may be deciphered from a video image by reference to various fixed data sources and/or the application of known methods for elucidating such information from video or image data, such as shape-from-motion or shape-from-shading techniques. Alternatively, all or some of this information may be provided to the system together with the video or image data via a preconfigured side channel. The system coordinates and assembles the image data with the data relating to geometry and material properties of the objects and provides a realistic haptic interaction with those objects to the user.

31 Claims, 6 Drawing Sheets

U.S. PATENT DOCUMENTS

| | | | |
|---|---|---|---|
| 5,734,373 A | | 3/1998 | Rosenberg et al. |
| 5,736,978 A | | 4/1998 | Hasser et al. |
| 5,737,505 A | | 4/1998 | Shaw et al. |
| 5,742,278 A | | 4/1998 | Chen et al. |
| 5,754,023 A | | 5/1998 | Roston et al. |
| 5,767,839 A | | 6/1998 | Rosenberg |
| 5,882,206 A | * | 3/1999 | Gillio .......................... 434/262 |
| 6,026,189 A | * | 2/2000 | Greenspan ................... 382/226 |
| 6,075,967 A | * | 6/2000 | Naimark et al. ......... 434/307 R |
| 6,111,577 A | * | 8/2000 | Zilles et al. ................ 345/355 |
| 6,192,150 B1 | * | 2/2001 | Leow et al. ................ 382/190 |

OTHER PUBLICATIONS

Zorin, D., et al., "Interactive Multiresolution Mesh Editing," *Computer Graphics Proceedings Annual Review Converence*, pp. 259–268, (1997).

Debevec, P., et al., "Modeling and Rendering Architecture from Photographs," *Computer Graphics Proceedings Annual Conference Series*, pp. 211–228 (1998).

Mark, W., et al., "Adding Force Feedback to Graphics Systems: Issues and Solutions," Computer Graphics Proceedings Annual Conference Series, pp. 447–452, (1996).

Pighin, F., et al., "Synthesizing Realistic Facial Expressions from Photographs," *Computer Graphics Proceedings Annual Conference Series*, pp. 75–84 (1998).

Shi, J., et al., "Good Features to Track," *IEEE Conference on Computer Vision and Pattern Recognition* (1994).

Sun, Z., "3–D Model Reconstruction for Interactive Video Processing," www.seas.rochester.edu:8080/ee/users/tekalp/research/res8.html., (downloaded Nov. 20, 1997).

Szeliski, R., "Recovering Geometry I," *Computer Graphics Proceedings Annual Conference Series*, pp. 133–171 (1998).

Tomasi, C., Pictures and Trails: A New Framework for the Computation of Shape and Motion from Perspective Image Sequences, *IEEE Conference on Computer Vision and Pattern Recognition*, (1994).

Tomasi, C., et al., "Shape and Motion from Image Streams: A factorization Method," *Cornell TR 92–1270 and Carnegie Mellon CMU–CS–92–104*. (1992).

Author Unknown, "Volume Deformation Physically Based Volume Graphics Manipulations for Medical Applications," www.cs.sunysb.edu/~vislab/projects/deform/summary.html. (downloaded Nov. 14, 1992).

Author Unknown, "The Visible Human Project Fact Sheet," www.nlm.nih.gov/pubs/factsheets/visible_human.hmtl, (downloaded Dec. 1, 1997).

Author Unknown, "Spatial Robots," www.sop.inria.fr/safa/personnel/merlet/archi/node2.html. (downloaded Nov. 19, 1998).

Ruspini, Diego C., et al., "The Haptic Display of Complex Graphical Environments", *Computer Graphics Proceedings Annual Conference Series*, (1997).

* cited by examiner

HAPTIC INTERACTION WITH VIDEO AND IMAGE DATA

BACKGROUND OF THE INVENTION

The present invention relates generally to the field of haptics. More specifically, the present invention relates to methods and apparatuses for haptic interaction with video and image data.

Haptics is the field of touch sensation. One rapidly evolving area of computer technology is the development of haptic interfaces, that is, interfaces which provide a touch-sensitive link between a physical haptic device and an electronic environment. With a haptic interface, a user can obtain touch sensations of surface texture and rigidity of electronically generated virtual objects, such as may be created by a computer-aided design (CAD) system. Alternatively, the user may be able to sense forces as well as experience force feedback from haptic interaction with an electronically generated environment.

A haptic interface system typically includes a combination of computer software and hardware. The software component is capable of computing reaction forces as a result of forces applied by a user "touching" an electronic object. The hardware component is a haptic device that delivers and receives applied and reaction forces, respectively. Existing haptic devices include, for example, joysticks (such as are available from Immersion Human Interface Corporation, San Jose, Calif.; further information is available at www.immerse.com, the disclosure of which is incorporated herein by reference for all purposes), one-point probes (such as a stylus or "spacepen") (such as the PHANToM™ product available from SensAble Technologies, Inc., Cambridge, Mass.; further information is available at www.sensable.com, the disclosure of which is incorporated herein by reference for all purposes) and haptic gloves equipped with electronic sensors and actuators (such as the CyberTouch product available from Virtual Technologies, Inc., Palo Alto, Calif.; further information available at www.virtex.com, incorporated herein by reference for all purposes). The types of haptic interfaces available continue to be expanded, and their level of sophistication improved.

Haptic interfaces and devices have found application in a variety of research fields, as well as in some commercial products incorporating devices such as those noted above. Research has focussed on manipulating surface or volumetric models, or holographic objects. Commercial fields of application include medicine (e.g., simulation of laparoscopic surgery), product design (e.g., automotive styling), and entertainment (e.g., virtual reality, electronic games).

In all of the foregoing cases, the electronic objects or environments with which haptic interaction takes place are computer-generated. One of the most widely-used formats of entertainment and information is video, either through video tape or television. The present inventors have recognized that a viewer's experience of the video medium could be enhanced by providing haptic interaction with objects and environment in a video image. However, as noted above, haptic interfaces have not yet been applied to video and image data. Haptic interaction has so far been limited to virtual objects or environments. Accordingly, the development of a system for haptic interaction with video and image data would be desirable.

SUMMARY OF THE INVENTION

The present invention meets this need by providing methods and systems for haptic interaction with video and image data. The methods and systems of the present invention receive video or image data, for example via television broadcast, cable or satellite television signal, or directly from a video player, and process the data to determine the geometry and material properties of various objects represented in the video image. Geometry and material property information may be deciphered from a video image by reference to various fixed data sources and/or the application of known methods for elucidating such information from video or image data, such as shape-from-motion or shape-from-shading techniques. Alternatively, all or some of this information may be provided to the system together with the video or image data via a preconfigured side channel. The system is able to coordinate and assemble the image data with the data relating to geometry and material properties of the video objects and provide a realistic haptic interaction with those objects to the user.

In one aspect, the present invention provides a method of haptically interacting with a video image. The method involves receiving a video image, determining geometry of one or more objects represented in the video image, and using a haptic display to interact with objects represented in the video image. The method may also include determining material properties of one or more objects represented in the video image, prior to the haptic interaction.

In another aspect, the invention provides a method of haptically interacting with a video image which includes receiving a video image, determining three-dimensional geometry of one or more objects represented in the video image, determining material properties of objects represented in the video image, elucidating a three-dimensional model for objects represented in the video image, and haptically interacting with the model.

In still another aspect, the invention provides a system for haptically interacting with a video image. The system includes a video display module, an image understanding module, a model recognizer module, and a haptic display module. The system may also include a video data signal decoder.

These and other features and advantages of the present invention will be presented in more detail in the following specification of the invention and the accompanying figures which illustrate by way of example the principles of the invention.

DETAILED DESCRIPTION OF PREFERRED EMBODIMENTS

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides methods and systems for haptic interaction with video and image data. The methods and systems of the present invention receive video or image data, for example via television broadcast, cable or satellite television signal, or directly from a video player, and process the data to determine the geometry and material properties of various objects represented in the video image. Geometry and material property information may be deciphered from a video image by reference to various fixed data sources and/or the application of known methods for elucidating such information from video or image data, such as shape-from-motion or shape-from-shading techniques. Alternatively, all or some of this information may be provided to the system together with the video or image data via a preconfigured side channel. The system is able to coordinate and assemble the image data with the data relating to geometry and material properties of the video objects and provide a realistic haptic interaction with those objects to the user.

Figure 1A:
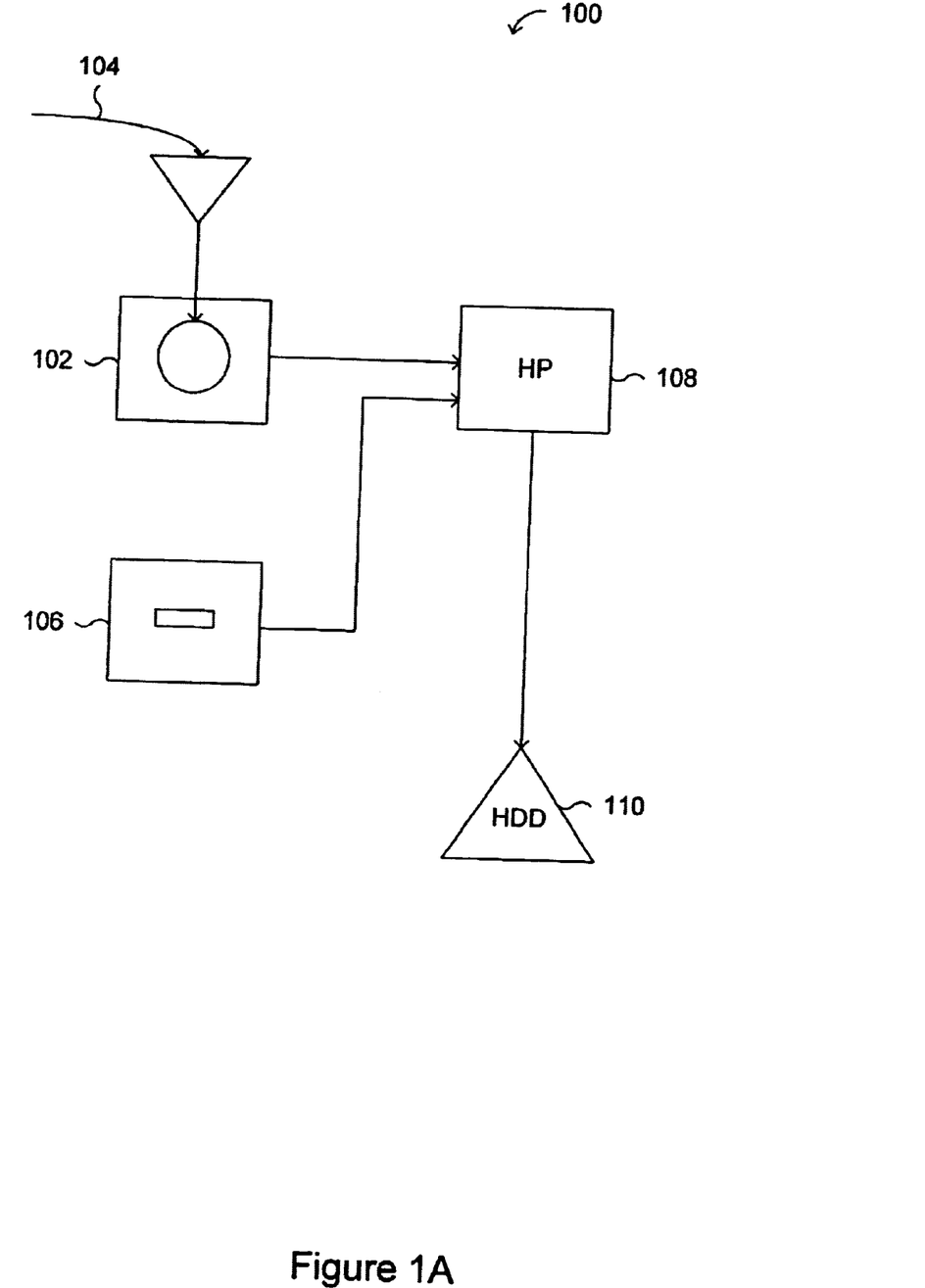
FIGS. 1A and 1B depict block diagrams illustrating overviews of systems for haptic interaction with video or image data in accordance with preferred embodiments with the present invention.

FIG. 1A depicts a block diagram overview of a system for providing haptic interaction with video and image data in accordance with a preferred embodiment of the present invention. The system 100 includes a television (TV) signal receiver 102, such as any conventional TV receiver, capable of receiving a TV signal 104, such as a conventional TV signal, from any available source, including broadcast, cable and satellite. In an alternative embodiment, the TV receiver 102 may be replaced by a video player 106 which outputs video data. In yet another alternative embodiment, discussed in more detail below, the system may involve both a TV receiver, and a video player, e.g. where prerecorded side information is synced with a TV broadcast (such as a rerun) and/or alternative video sequences prerecorded for use in two-way interactive embodiments of the invention.

A video data is output from element 102 (and/or 106) to a haptic processor 108. The haptic processor 108 is responsible for determining the geometry and material properties of various objects represented in the video image. In accordance with one embodiment of the present invention, the haptic processor accomplishes this task by the following series of steps: First a video image, such as the first frame in the video, is read from the incoming video signal. Each incoming frame is identified for future reference and cross-reference to other frames in the video. Next, the image is segmented into its various component elements, such as human figures, and other animate and inanimate objects in the image. This segmentation process may be accomplished automatically, for instance through the use of known image segmentation, edge detection, shape-from-shading, and shape-from-motion techniques. Segmentation may also be conducted semi-automatically through the use of user feedback and identification. This semi-automatic approach may be faster than a fully-automatic approach and may assist in the resolution of overlaps of elements in the video image. The semi-automatic segmentation process may be assisted by an input device, such as a keyboard or mouse, or by the haptic device itself in an identification mode. At this stage, a three-dimensional geometry of the object in the video image has been determined.

Next, the process may proceed to fit a three-dimensional model to the three-dimensional geometry of the object of interest in the video image. For this purpose, libraries of fixed data of three-dimensional object models and their corresponding material properties may be made available for the haptic processor to correlate features in the video image to their associated objects, for instance, from data stored in databases or libraries accessible to the system. For example, the Visual Human Project libraries of the National Library of Medicine (NLM) provides detailed three-dimensional data relating to the geometry and material properties of the male and female human bodies (human haptic models), to cite a complex example. Access to these libraries is available to the public under license. Further information may be obtained from the NLM website (www.nlm.nih.gov). Similar geometrical and material property data is available for a wide variety of inanimate objects as well as other animate objects frequently seen in video images. Such data is available from several companies, including Viewpoint Datalabs International, Orem Utah (e.g., Viewpoint Catalog; see website, www.viewpoint.com for further information), Zygote Media Group, Inc., Provo, Utah (e.g., Quick Reference Catalog; see website, www.zygote.com for further information), Safework Inc., Montreal, Quebec, Canada e.g., VirtualMan product; see website, www.safework.com for further information), and Paraform, Palo Alto, Calif. (e.g., 3 D Digital Content library; see website, www.paraform.com for further information), for example. The content of these libraries and catalogs is incorporated by reference herein for all purposes.

In addition to matching objects represented in video images with corresponding three-dimensional object models in order to apply appropriate material properties for haptic interaction, the haptic processing system may also be configured to alter several adjustable parameters to account for variability in various individual objects of a class. For example, the three-dimensional geometry and material property data obtained from a fixed data source for a human figure (e.g., a Visual Human Project library) in a video image could be adjusted to reflect variations in height, weight, and other aspects of body size, shape and tone. Technology is currently available and under development to provide such capability, for example the research on multiresolution methods and remeshing performed at a variety of institutions, including the University of Washington, University of Southern California, Stanford University and others. Sample publications of research in this area include, Kobbelt, L., Campagna, S., Vorsatz, J, and Seidel, H-P., Interactive Multi-resolution Modeling on Arbitrary Meshes. Computer Graphics Proceedings, Annual Conference (1998), 105–114, and Zorin, D., Schroder, P., and Sweldens, W, Interactive Multiresolution Mesh Editing. Computer Graphics Proceedings, Annual Conference (1997), 259–268, the disclosures of which are incorporated by reference herein for all purposes.

Once the three-dimensional geometry and material properties have been determined for the features of interest in a particular video image, a user may haptically interact with the video image using a haptic display device 110. Any of several known or yet to be developed haptic display devices may be used for haptic interaction with video in accordance with the present invention. The haptic display device 110 may be used to explore the various objects represented in the video image, providing haptic feedback to the user.

Haptic processing is preferably continued for subsequent frames of the video after the first processed frame. Additional data obtained through processing of these additional frames may be used to refine the three-dimensional geometry and material property models of the objects represented in the video image in order to further enhance the user's haptic interaction with the video image. In this way, data accumulated from multiple preceding frames may be used to enhance the user's interaction with a paused video image, for example.

According to one particular implementation of the present invention, the system can accept as an input the identity of people in a video image on a screen, for example their names or attributes, as well as tags for each person in the first or subsequent processed frame of the video footage. The system can then track the coordinates of these tags and update the haptics for the video image scene-by-scene based on who enters and leaves, and where they go. This technique improves haptic processing efficiency by permitting the caching of data relating to objects represented in video images, thereby reducing or eliminating duplicate processing for video images of the same object appearing in different frames of the video. An additional input can be haptic parameters of the clothing that the people in the video image are wearing, if applicable.

Figure 1B:
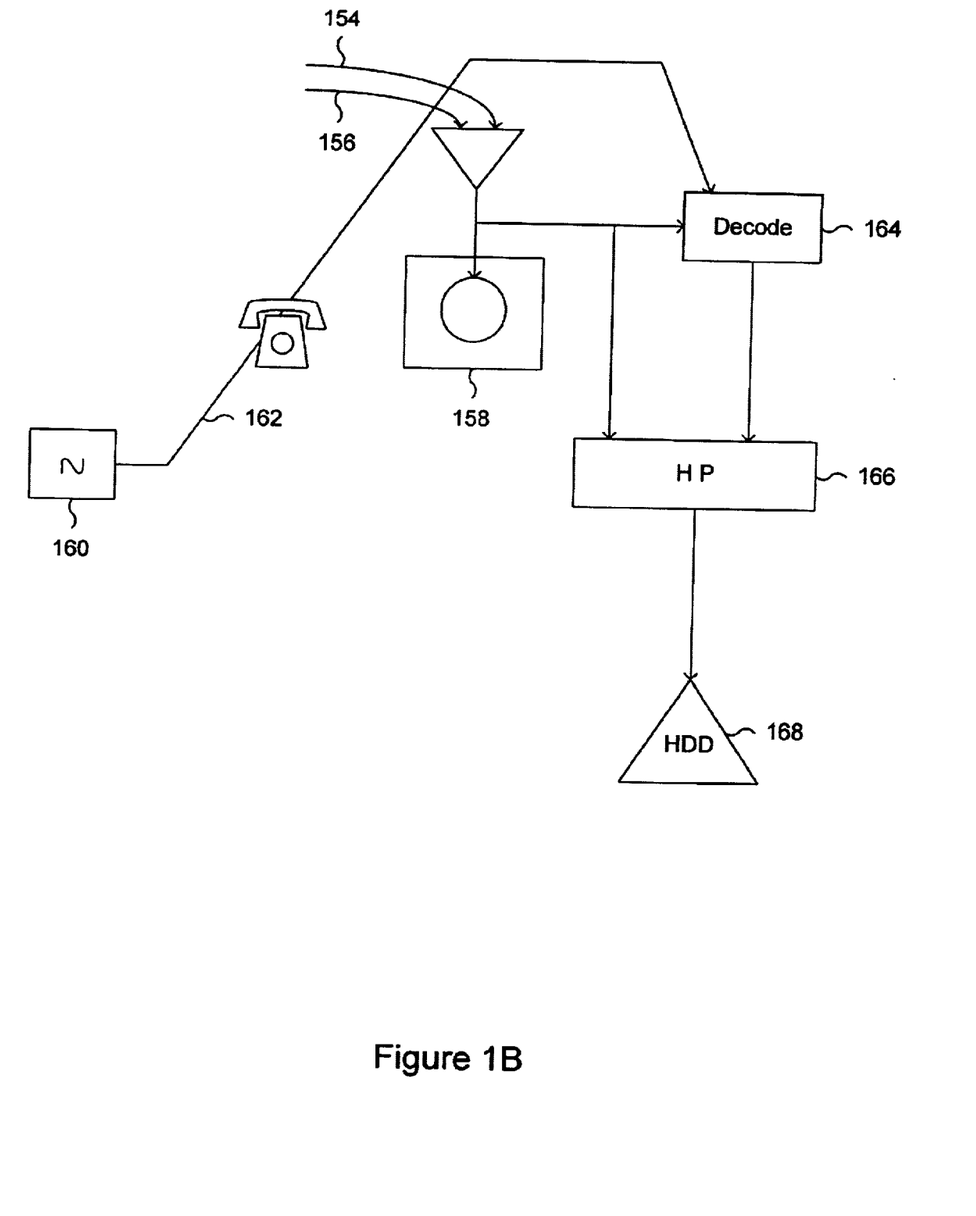

An alternative embodiment of the present invention is illustrated in overview in FIG. 1B. In this alternative embodiment, a conventional television signal 154 is supplemented by a side information signal 156, analogous to a closed-captioning signal accompanying conventional TV broadcasts. The side information signal 156 carries data relating to haptic properties of objects represented in the video image carried by the broadcast signal 154. The television and side signals 154 and 156 are received by a receiver 158, such as a conventional TV receiver.

As with the embodiment of the invention described with reference to FIG. 1A, the video image data can instead be provided by a video player in place of the television signal receiver 158. If a video player is used, data relating to the geometry and material properties, and optionally other aspects of the video image such as information relating to classification (e.g., shape-type of object) and location (absolute and/or relative), of objects represented in the accompanying video image can be provided in a pre-recorded side information signal on a specialized tape or digital storage medium, such as a video disk. Thus, generally, the present invention may provide fixed data parameters encoded in such a side signal via broadcast, cable, satellite, etcetera, or on a specialized pre-recorded medium. This fixed data can be correlated with input data gleaned from a live input screen, or the geometry and material property information may be even provided from the source, if interactive. The specialized representation provided by a pre-recorded video medium provides the advantage of speed and simplicity. The advantage of deriving a model for haptic interaction computationally from the video image is that all the identifying information need not be recorded ahead of time.

In yet another implementation of the embodiment of the present invention depicted in FIG. 1B, the side information providing haptic data relating to the video image signal 154 may be provided by a separate source 160 conveyed to the user's haptic processor system via a separate line 162, for example a telephone modem, cable modem, radio link, etcetera.

Following receipt of the primary video signal 154 and side information signal 156 or 162, the signals are passed through a decoder 164, before being forwarded to a haptic processor 156. The decoder 164 is responsible for handling and correlating the two signals. Such decoders are well known to those of skill in the art. The video image signal portion of the received signals is passed-on to the haptic processor for processing as previously described with reference to FIG. 1A. The side information signal portion of the signals is also passed the haptic processor to serve as the fixed data, or a portion thereof, for haptic processing as previously described.

The use of pre-recorded video images and side information signals also provides the possibility for two-way haptic interaction with a video image scene. This may be achieved by a combination of haptic sculpting technology together with a library of reactions to haptic interaction with a particular interaction with a particular video image pre-recorded in video form. In this way, an object represented in a video image could be made to respond, both haptically and visually, to forces delivered via a haptic display device.

There are a number of possibilities for the mechanical structure of the haptic force-feedback devices that a user may use to interact with a video image. Several examples, such as the joystick, space pen, and glove, have already been mentioned. Additional designs, including hexapod-type devices which use pure tension with a rod having sets of strings in different planes, may provide an enhanced haptic interface for interaction with video images. Such Hexapod devices are described in the work of Hiroshi Iwata and others, and are reviewed in the online article, "Spatial Robots" at www-sop.inria.fr/saga/personel/merlet/Archi/node2.htm, incorporated herein by reference for all purposes.

The size of the haptic display device will effect the scale of the force feedback a user can experience. Haptic devices may be equipped with a controller to change the scale of interaction based on the mode of exploration. For example, a glove-type device may be equipped with a knob to adjust the scale for exploration of a complete video scene, versus exploration of a particular object represented in that video image.

Figure 2A:
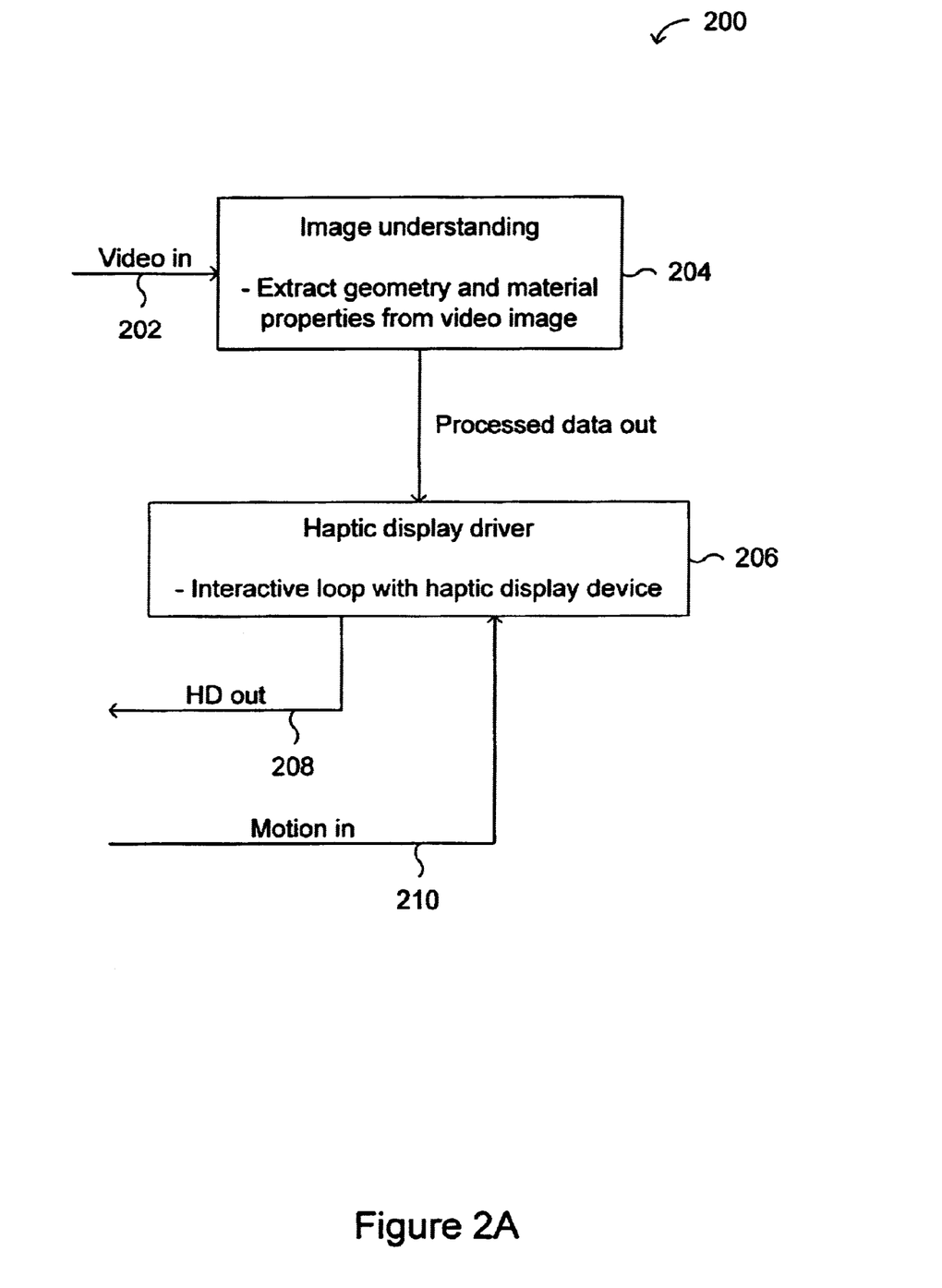
FIG. 2A and 2B depict block diagrams illustrating haptic processing components of preferred systems for haptic interaction with video or image data, for example those illustrated in FIGS. 1A and 1B, respectively.
Figure 2B:
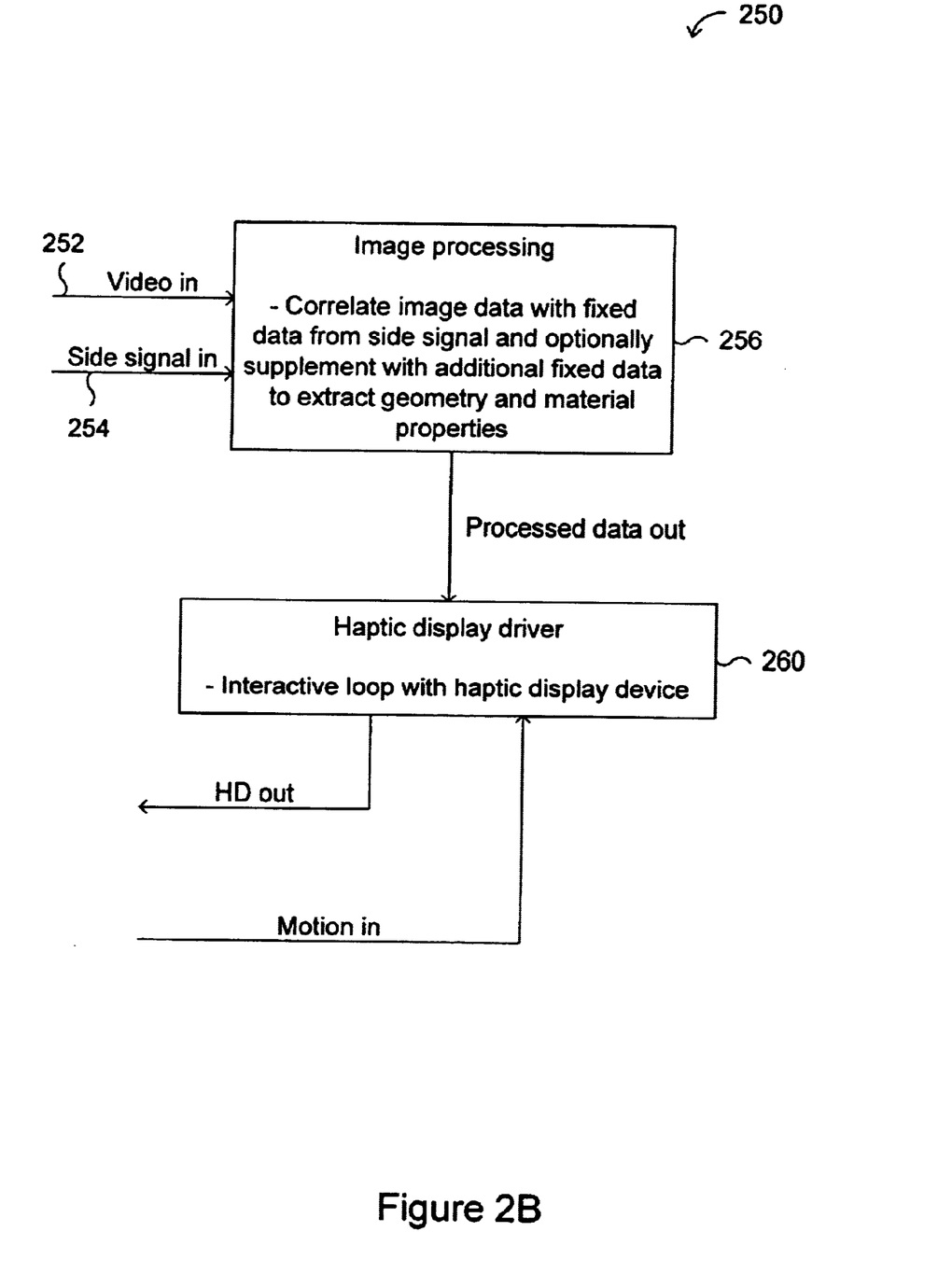

FIGS. 2A and 2B illustrate blocked diagrams of haptic processing components of preferred systems for haptic interaction with video or image data in accordance with the present invention.

FIG. 2A shows a preferred haptic processor for a system in which geometry and material properties of objects represented in a video image are derived directly from the image data itself (i.e., no side information), such as the system depicted in FIG. 1A. This haptic processor 200 receives a video image signal as represented by arrow 202. The image signal is then processed in an image processor 204 according to known image understanding techniques such as shape-from-motion and shape-from-shading in order to extract geometry and material property information for the various objects of interest represented in the video image. The image processor preferably includes a microprocessor and such other computer hardware, as are well known in the art, for supporting image processing operations.

Once the pertinent geometry and material property information has been obtained from the video image, this information is passed on to a haptic display driver 206. The haptic display driver 206 interfaces with a haptic display device (not shown) associated with the haptic processor. This interface is illustrated by arrows 208, which represents haptic data being output to the haptic display device, and arrow 210 which represents motion of the haptic display device by the user being returned to the haptic display driver 206. In this way, the forces applied to the user through the haptic display device may be coordinated with the data provided by the image processing component 204 of the system.

In one embodiment of the present invention, the material properties of a object, or a portion thereof, represented in a video image are determined with reference to the surface properties of the model corresponding to the object. This is preferred in this embodiment so that the haptic display is not allowed to become out of sync with the visual display, as would be the case where a user applying sufficient force through a haptic display could "punch through" the object (model) surface. This technique is further described in Ruspini, D. C., Kolarov, K. and Khatib, O., "The haptic display complex graphical environments," *Computer Graphics Proceedings, Annual Conference Series* (1997), 345–352. This approach is also consistent with the limited force permitted to be generated by a haptic device for safety and other reasons. Operation of the haptic interaction system in this way should enhance rather than detract from the user's overall haptic and visual experience despite the limitations imposed, since its ensures coordination and consistency of the haptic and visual displays.

FIG. 2B illustrates a block diagram of haptic processing components of a preferred system for haptic interaction with video or image data in accordance with an alternate preferred embodiment of the present invention. A haptic processor 250, such as the haptic processor 166 described with reference to FIG. 1B, makes use of fixed data in a side signal provided together with the primary video image data feed. In this implementation of a haptic processor, a video signal, represented by arrow 252, and a side signal, represented by arrow 254, are provided to an image processing component 256. The image processing component 256 correlates the image data from the primary video signal with the data from the side signal, and optionally supplements that information with additional fixed data, for instance, data stored in databases or libraries accessible to the system, in order to extract the geometry and material properties of images of objects represented in the video image data provided to the image processing component 256. The haptically processed image data is then passed out of the image processing component 256, to a haptic display driver 260. The haptic display driver 260 interfaces with a haptic display device as described above with reference to FIG. 2A.

It should be noted that in some embodiments of the present invention, side information may be provided from a plurality of sources (e.g., a side TV signal and prerecorded side information from a video player). In addition, multiple video sources may be provided, with or without side information, so that, for example, alternative video sequences prerecorded for use in two-way interactive embodiments of the invention.

Figure 3:
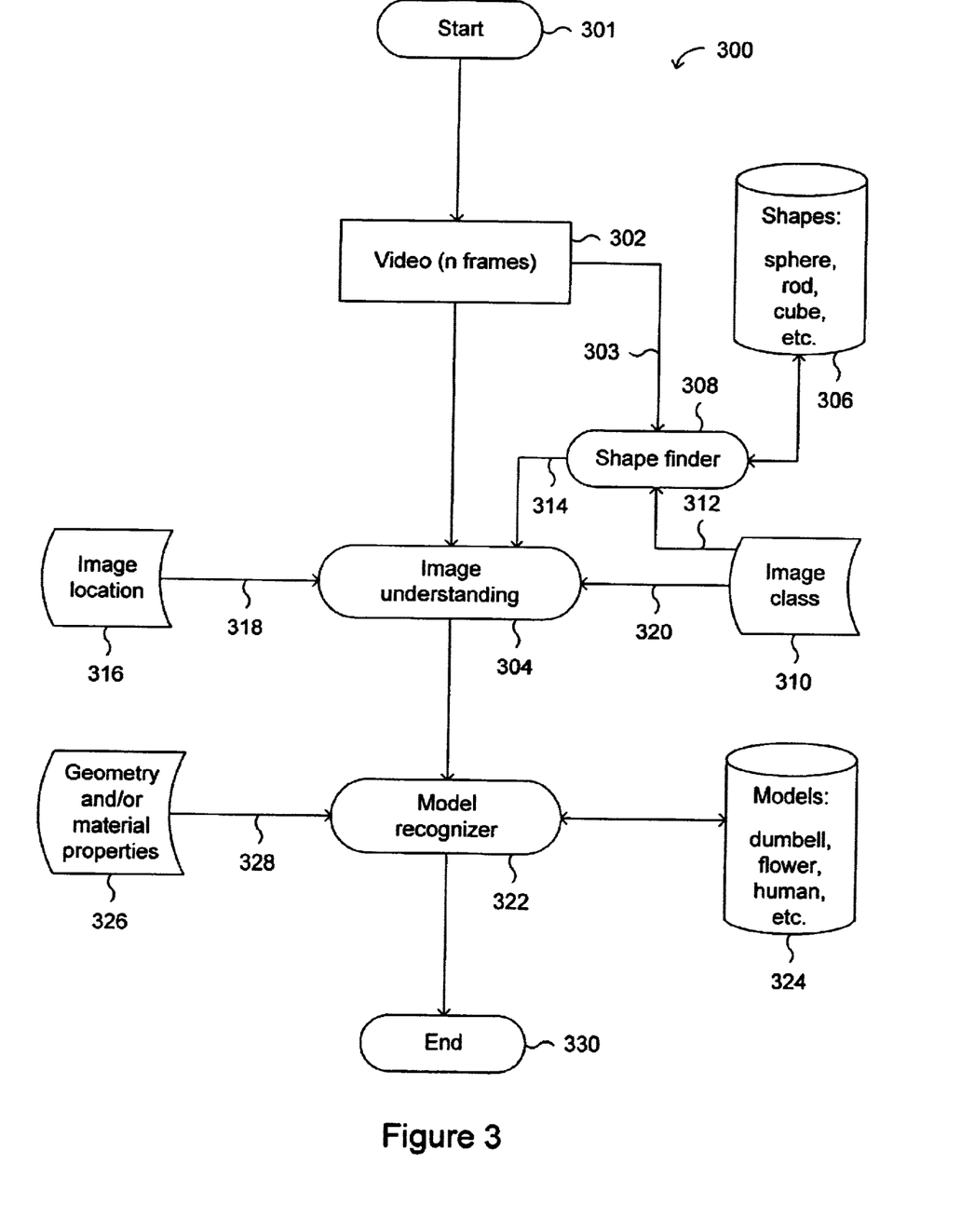
FIG. 3 illustrates a flow chart of a process of providing haptic interaction with video or image data in accordance with a preferred embodiment of the present invention.

FIG. 3 illustrates a block diagram of a system for providing haptic interaction with video or image data in accordance with a preferred embodiment of the present invention. FIG. 3 may also be viewed as a flow chart of a preferred process of providing haptic interaction with video or image data in accordance with the preferred embodiment, and is described as such below. The process 300 starts at 301 and at a step 302 video data is received by a haptic processing system. The video data received may represent one or more frames. The video data may or may not be accompanied by side information carried in a portion of its signal or in a separate signal from the same or an alternate source. Where the video data is not accompanied by any side information, an image-understanding process may be used at a step 304 in order to locate objects of interest represented in the video image and to determine their three-dimensional geometries. These tasks may be accomplished by the application of known shape-from-motion or shape-from-shading techniques, for example.

Arrow 303 represents an alternative path whereby the video image data received at step 302 is initially processed by a shape finder at a step 308. The shape finder may make use of a source of fixed data, such as a library of shapes 306, which may be compared with the shapes of objects identified in the video image by the shape finder process in order to assist in primary classification of objects represented in the video image. The shape library 306 may be a database, such as are well known in the art, containing, for example, two-dimensional depictions of various three-dimensional objects such as spheres, rods, tubes, etcetera. When the shape finder processing is completed, its result is provided to the image understanding processing 304, as illustrated by arrow 314.

When side information is provided together with the primary video signal, the side information may constitute or include classification of one or more objects of interest represented in the video image. Such classification side information 310 may be passed to the shape finder 308 in order to assist the process in classifying objects in the video image, as illustrated by arrow 312. In addition, it should be noted that it is possible to provide classification side information 310 which definitively identifies objects in the video image, and therefore minimizes or eliminates the need for shape finder processing. Such side information may feed directly into the image understanding step 304, as illustrated by arrow 320.

Geometry data for objects represented in the video image data obtained at step 304 preferably also includes a determination of the locations of these objects within the video image and relative to each other. In embodiments where side information is provided together with the primary video image data, side information relating to the location of objects identified in the video image may be provided to assist with the positioning of objects at this stage. Such location side information 316 may be provided to assist this step as shown by arrow 318.

Once the haptic processing system has determined the three-dimensional geometries of objects of interest in the image, this information may then be correlated with models corresponding to the objects at a step 322. In a preferred embodiment, step 322 makes use of a model recognizer process which uses fixed information relating to various three-dimensional models to correlate with the three-dimensional geometry information in order to determine material properties for the objects of interest in the video image. The model recognizer process preferably makes use of a model library which contains three-dimensional geometric data for a variety of modeled objects, together with the corresponding material properties for those modeled objects. For example, model library 324 may include the dimensions and material properties for a table, a flower, and a human being, among thousands of other objects which may be observed in a video image.

Once the model recognizer process at step 322 is completed, the haptic processing system may pass on to the haptic display driver the complete three-dimensional geometry and material properties for an object represented in a video image, or the complete video image, with which a user may then haptically interact using a haptic display device.

In an alternative, simplified embodiment, the objects represented in the video image may be attributed arbitrary material properties. For example, in the case of a video showing various geometric objects, the objects may be attributed a uniform, maximal hardness. A user may hapitically interact with the figures without the need for a determination of material properties having been made.

It should be noted that where side information is provided together with the video image signal, it is possible to provide three-dimensional geometry and/or material property information 326 for objects of interest in the video image to the model recognizer process 322, as represented by arrow 328, in order to assist in the development of complete three-dimensional geometry and material property data for output to the haptic display driver. Where complete three-dimensional geometry and material property information side information is provided, supplemental fixed information may not be required for the model recognizer to perform its function. The process flow ends at 330.

Figure 4:
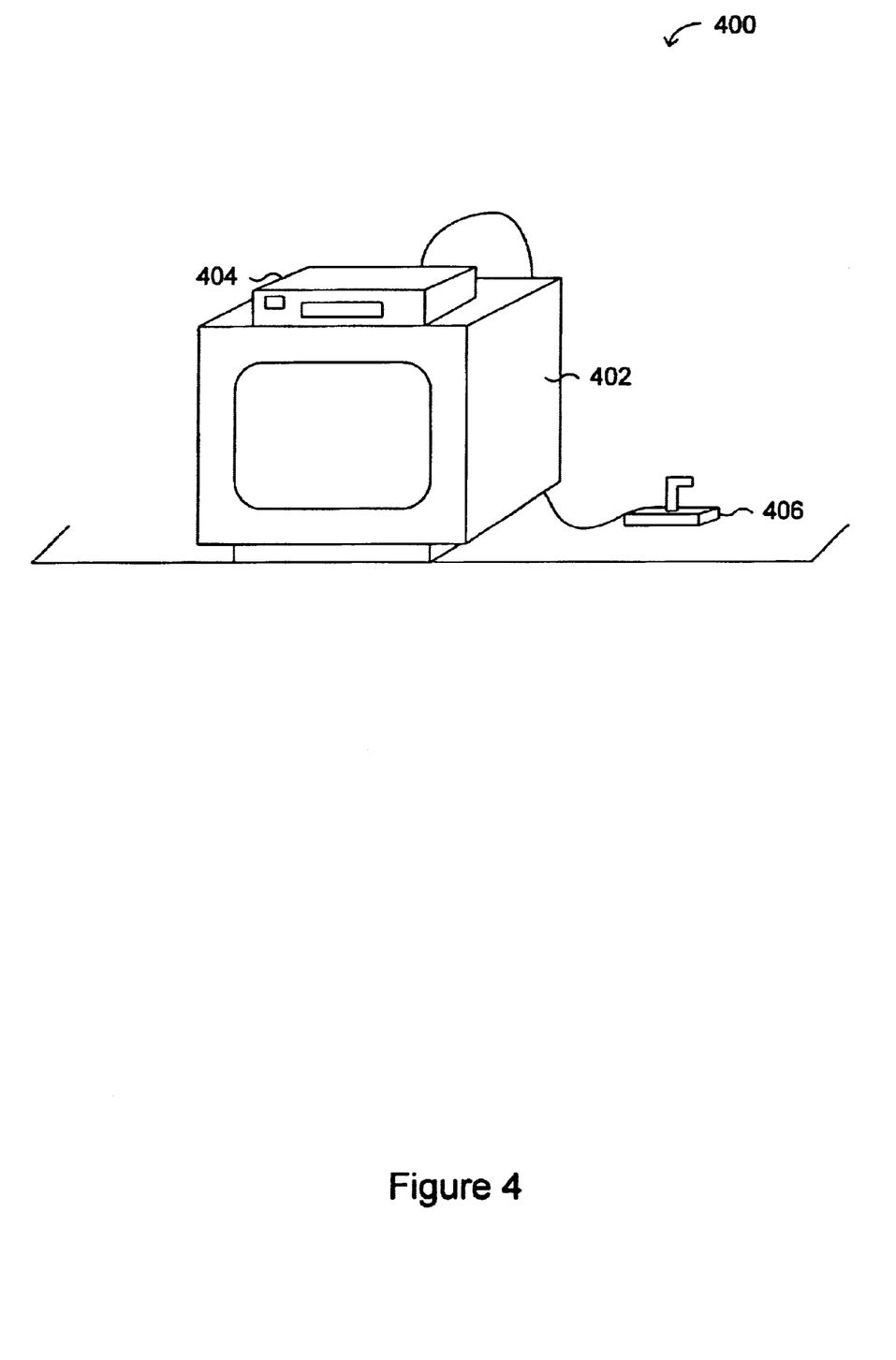
FIG. 4 depicts a block diagram of a user station for a system for providing haptic interaction with video or image data in accordance with a preferred embodiment of the present invention.

FIG. 4 illustrates a block diagram of a user station for a system for providing haptic interaction with video image data in accordance with a preferred embodiment of the present invention. The station 400 provides a video terminal 402 such as a television or other video monitor for visually displaying received video images. The station also includes a housing 404 for a system for haptically interacting with a video image, such as illustrated in block form in FIG. 3, equipped with connections to the video monitor 402. The haptic system is capable of receiving a video image signal for example via a television broadcast, cable or satellite signal, or a signal received from a video player. The video player may be incorporated into the housing for the haptic interaction system. The haptic system may also be capable of receiving a side information signal, providing information relating to the classification, location, geometry and/or material properties of objects represented in the video image.

In addition, the user station includes a haptic display device 406 which interfaces with the haptic interaction system, preferably via a haptic display driver and haptic processor, such as described above. Thus, in this preferred embodiment, the station for haptically interacting with a video image has an appearance not unlike that in a conventional desktop personal computer.

Conclusion

Therefore, as described herein, the present invention provides methods and systems for haptic interaction with video and image data. Preferred embodiments of the invention may be implemented with existing state-of-the-art technology relating to haptic interfaces and video data processing. The following references provide details which may be useful in implementing the present invention in accordance with the preceding description. These references, and all other references cited above, are incorporated by reference herein for all purposes:

U.S. Pat. No. 5,767,839, to Rosenberg, entitled "Method and apparatus for providing passive force feedback to human-computer interface systems"

U.S. Pat. No. 5,754,023, to Roston, et al., entitled "Gyro-stabilized platforms for force-feedback applications"

U.S. Pat. No. 5,742,278, to Chen, et al., entitled "Force feedback joystick with digital signal processor controlled by host processor"

U.S. Pat. No. 5,739,811, to Rosenberg, et al., entitled "Method and apparatus for controlling human-computer interface systems providing force feedback"

U.S. Pat. No. 5,737,505, to Shaw, et al., entitled "Tactile interface apparatus for providing physical feedback to a user based on an interaction with a virtual environment"

U.S. Pat. No. 5,736,978, to Hasser, et al., entitled "Tactile graphics display"

U.S. Pat. No. 5,734,373, to Rosenberg, et al., entitled "Method and apparatus for controlling force feedback interface systems utilizing a host computer"

U.S. Pat. No. 5,731,804, to Rosenberg, entitled "Method and apparatus for providing high bandwidth, low noise mechanical I/O for computer systems"

U.S. Pat. No. 5,724,264, to Rosenberg, et al., entitled "Method and apparatus for tracking the position and orientation digitizing a 3-D object"

U.S. Pat. No. 5,721,566, to Rosenberg, et al., entitled "Method and apparatus for providing damping force feedback"

U.S. Pat. No. 5,719,561, to Gonzales, entitled "Tactile communication device and method"

U.S. Pat. No. 5,709,219, to Chen, et al., entitled "Method and apparatus to create a complex tactile sensation"

U.S. Pat. No. 5,701,140, to Rosenberg, et al., entitled "Method and apparatus for providing a cursor control interface with a force feedback"

U.S. Pat. No. 5,694,013, to Stewart, et al., entitled "Force feedback haptic interface for a three-dimensional CAD surface"

U.S. Pat. No. 5,691,898, to Rosenberg, et al., entitled "Safe and low cost computer peripherals with force feedback for consumer applications"

U.S. Pat. No. 5,642,469, to Hannaford, et al., entitled "Direct-drive manipulator for pen-based force display"

U.S. Pat. No. 5,629,594, to Jacobus, et al., entitled "Force feedback system"

U.S. Pat. No. 5,625,576, to Massie, et al., entitled "Force reflecting haptic interface"

U.S. Pat. No. 5,623,582, to Rosenberg, entitled "Computer interface or control input device for laparoscopic surgical instrument and other elongated mechanical objects"

U.S. Pat. No. 5,587,937, to Massie, et al., entitled "Force reflecting haptic interface"

U.S. Pat. No. 5,581,670, to Bier, et al., entitled "User interface having movable sheet with click-through tools"

U.S. Pat. No. 5,576,727, to Rosenberg, et al., entitled "Electromechanical human-computer interface with force feedback"

U.S. Pat. No. 5,414,337, to Schuler, entitled "Actuator having electronically controllable tactile responsiveness"

U.S. Pat. No. 5,381,080, to Schnell, et al., entitled "Control Device"

U.S. Pat. No. 5,220,260, to Schuler, entitled "Actuator having electronically controllable tactile responsiveness"

Debevec, P., Taylor, C., and Malik, J., "Modeling and rendering architecture from photographs," *Computer Graphics Proceedings, Annual Conference Series* (1998), 211–228.

Mark, W., Randolph, S., Finch, M., Van Verth, J., Taylor, R., "Adding force feedback to graphics systems: issues and solutions," *Computer Graphics Proceedings, Annual Conference Series* (1996), 447–452.

Pighin, F., Hecker, J., Lischinski, D. Szeliski, R., Salesin, D., "Synthesizing realistic facial expressions from photographs," *Computer Graphics Proceedings, Annual Conference Series* (1998), 75–84.

Shi, J., Tomasi, C., "Good features to track," *IEEE Conference on Computer Vision and Pattern Recognition* (1994).

Sun, Z., "3-D model reconstruction for interactive video processing," www.seas.rochester.edu:8080/ee/users/tekalp/research/res8.html.

Szeliski, R. "Recovering geometry I," *Computer Graphics Proceedings, Annual Conference Series* (1998),133–171.

Tomasi, C., "Pictures and trails: a new framework for the computation of shape and motion from perspective image sequences," *IEEE Conference on Computer Vision and pattern Recognition* (1994).

Tomasi, C., Kanade, T., "Shape and motion from image streams: a factorization method," *Cornell TR 92-1270 and Carnegie Mellon CMU-CS-92-104*.

"Volume deformation physically based volume graphics manipulations for medical applications," www.cs.sunysb.edu/~vislab/projects/deform/summary.html.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method of haptically interacting with a video image, comprising:
   receiving a video image;
   displaying the video image;
   determining geometry of one or more objects represented in the video image; and
   interacting with said one or more objects represented in the video image using a haptic display device;
   wherein interacting with said one or more objects includes sending haptic data to the haptic display device and receiving a force delivered via the haptic display device; and
   said one or more objects represented in the video image are visually seen in the video image to respond to the force delivered via the haptic display device.

2. The method of claim 1, further comprising:
   determining material properties of said one or more objects represented in the video image prior to said haptic interaction.

3. The method of claim 2, wherein said step of determining material properties of said one or more objects represented in the video image comprises use of a model recognizer.

4. The method of claim 3, wherein said model recognizer accesses a haptic model of a human.

5. The method of claim 1, further comprising:
   receiving side information including data defining characteristics of objects represented in the video image; and
   using the side information to assist in determining at least one of class, location, geometry, and material properties of said one or more objects represented in the video image.

6. The method of claim 5, wherein said side information is received as part of a television signal.

7. The method of claim 5, wherein said side information is received from a video player.

8. The method of claim 1, further comprising caching information determined for an object represented in a video image.

9. The method of claim 1, wherein said step of determining geometry of one or more objects represented in the video image comprises use of shape-from-motion techniques.

10. The method of claim 1, wherein said step of determining geometry of one or more objects represented in the video image comprises use of a shape filter.

11. The method of claim 1, wherein said video image is paused, and determinations of geometry and material properties obtained in one or more previous frames for one or more objects represented in the video are used as a basis for haptic interaction with said one or more objects represented in the paused video image.

12. The method of claim 1, wherein said video image is received from a television signal.

13. The method of claim 1, wherein said television signal has a source selected from at least broadcast, cable, and satellite.

14. The method of claim 1, wherein said video image is received from a video player.

15. The method of claim 1, wherein said geometry is three-dimensional.

16. A method of claim 1, wherein said one or more objects represented in the video image are capable of responding to the force delivered via the haptic display device haptically.

17. A method of claim 1, further including determining locations of said one or more objects within the video image.

18. A method of claim 1, further including determining locations of said one or more objects relative to each other.

19. A method of haptically interacting with a video image, comprising:
   receiving a video image;
   displaying the video image;
   determining three-dimensional geometry of one or more objects represented in the video image;
   determining material properties of said one or more objects represented in the video image;
   elucidating a three-dimensional model for said one or more objects represented in the video image; and
   haptically interacting with said model;
   wherein haptically interacting with said model includes sending haptic data to a haptic display device and receiving a force delivered via the haptic display device; and
   said one or more objects represented in the video image are visually seen in the video image to respond to the force delivered via the haptic display device.

20. A system for haptically interacting with a video image, comprising:
   a video display module configured to receive and display a video image;
   an image understanding module coupled to the video display module for processing the video image;
   a model recognizer module coupled to the image understanding module for recognizing a model; and
   a haptic display module configured to provide interactions with one or more objects represented in the video image using haptic data sent from the image understanding module and a force applied by a user;
   wherein the one or more objects represented in the video image are visually seen in the video image to respond to the force delivered via the haptic display device.

21. The system of claim 20, wherein said video display module comprises a television.

22. The system of claim 20, wherein said image understanding module comprises a microprocessor configured to operate video data processing software.

23. The system of claim 22, wherein said video data processing software comprises shape-from-motion protocols.

24. The system of claim 20, wherein said image understanding module comprises one or more sources of fixed data including shape data.

25. The system of claim 20, wherein said image understanding module comprises a shape finder.

26. The system of claim 20, wherein said model recognizer comprises one or more sources of fixed data including geometric and material property data for one or more objects.

27. The system of claim 26, wherein said one or more fixed data sources comprises one or more libraries of haptic models.

28. The system of claim 27, wherein said libraries of haptic models comprises a haptic model of a human.

29. The system of claim 20, wherein said haptic display module comprises at least one of a joystick, one-point probe, haptic glove, and hexapod device.

30. The system of claim 20, further comprising a video data signal decoder.

31. A system for haptically interacting with a video image, comprising:
- means for displaying a video image;
- means for determining the geometry of one or more objects represented in the video image;
- means for assigning material properties to said one or more objects represented in the video image; and
- means for haptically interacting with said one or more objects represented in the video image by sending haptic data to a haptic display device and receiving a force applied by a user via the haptic display-device;
- wherein the one or more objects represented in the video image are visually seen in the video image to respond to the force applied by the user via the haptic display device.

* * * * *